D. BLY.
Thill-Coupling.
No. 23,549.  Patented Apr. 12, 1859.
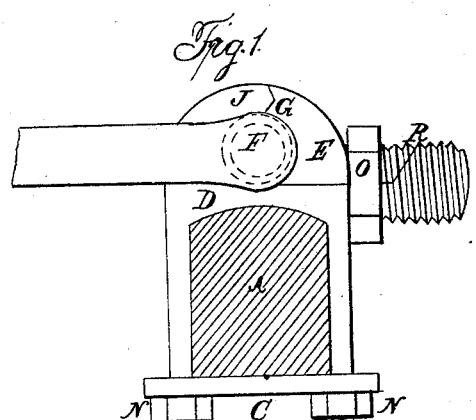
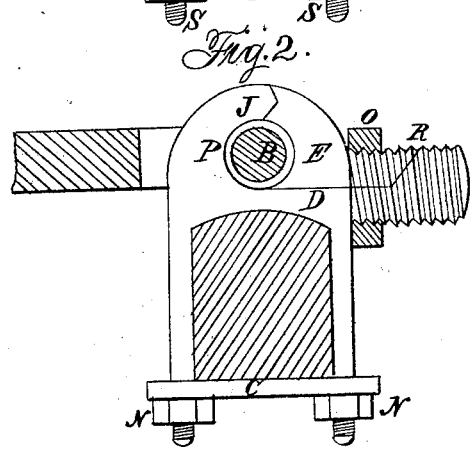
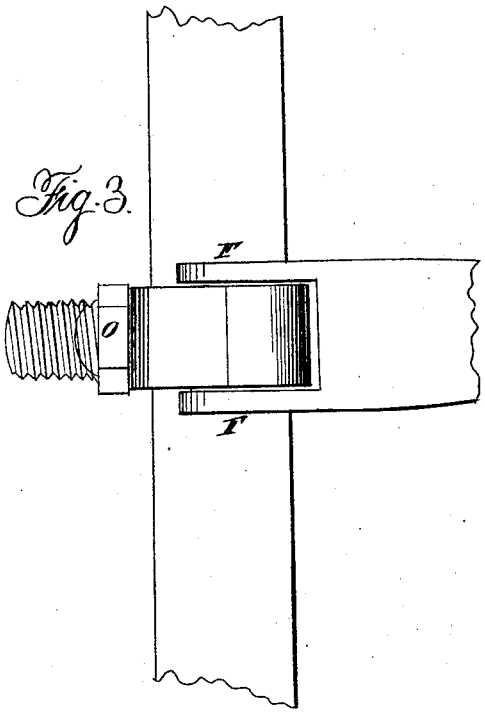
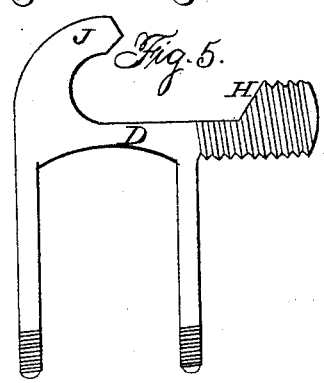
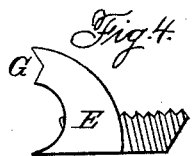
Witnesses.
Seth H. Perry
J. Franklin Peck
Inventor.
Douglas Bly.

UNITED STATES PATENT OFFICE.

DOUGLAS BLY, OF ROCHESTER, NEW YORK.

ATTACHING THILLS TO VEHICLES.

Specification of Letters Patent No. 23,549, dated April 12, 1859.

*To all whom it may concern:*

Be it known that I, DOUGLAS BLY, of the city of Rochester, in the county of Monroe, State of New York, have invented certain new and useful Improvements in the mode of attaching the thills and poles of buggies, carriages, and other vehicles to the axles or other suitable parts of the same; and I do hereby declare the following to be a full and accurate description of the same, reference being had to the accompanying drawings, making a part of this specification, and to the letters of reference marked thereon, same letters referring to like parts in all the figures.

Of said drawings, Figure 1, is a side elevation of my improved coupling as attached to an axle, and with the thills in place; Fig. 2, is a side elevation of the same, with the thills and nut broken away, to show the mode of connecting the two portions of the coupling; Fig. 3 is a plan of Fig. 1; Fig. 4 is a side elevation of the movable piece E separate from the other parts; Fig. 5 is a side elevation of the hooked block J. D.

In the figures previously described, (A) is the axle. On the axle rests the coupling, which is secured in its place by means of the clip, (C,) screws, (S,) and nuts (N,). This coupling is constructed as follows:— The hook (J, Fig. 5,) receives the draft bar of the thills and pole, and sustains the strain of the draft.

(E, Fig. 4,) is a separate and movable piece, and is so formed as to close the hook (J) and retain the draft bar (B,) and the packing, (P,) in place. It may be removed, at any time, to allow the draft-bar to be placed in the hook, or to be removed therefrom, also for the insertion of the packing.

Both (D, and E,) project backward, and form a male screw, (R,) each forming half, for a short distance; after which (D,) forms the whole, and by means of a shoulder (H,) sustains the strain when backing. The two portions (J, D, and E,) are held firmly together, by the groove, (G,)—which receives the beveled edge of (J,)—the fork (F,) of the thills or pole, and the nut, (O,) which affords the utmost security against accidental disengagement.

The shoulder H, is made slightly oblique, as represented; and the end of the movable piece, or block, E, is of corresponding form, and so arranged, in connection with said shoulder H, that there will be a slight wedge action, when the nut O, is turned on, thereby firmly pressing the notch G, over the hook J, and also serving to tighten the nut upon the screws, when backing, and thus to prevent its starting or working off, at such times. In this manner greatly increased security from accident is attained, as well as total freedom from the rattling of loose parts.

The ends of the thills and pole are formed with a fork, connected by a round cross-bar (B,) which rests in the hook (J,) as seen in Figs. (1, and 2.) Around the bar is placed the india-rubber, or other, packing (P,) which is easily adjusted, and replaced, when worn out. This prevents all noise; also all wear to the coupling. The packing is securely retained in place, by means of the fork of the thills and pole, which are so constructed as to cover it, as seen in Fig. (1,) where the dotted circles show the size of the draft bar, and the packing.

This coupling possesses great strength because the whole strain of the draft comes against the solid iron of the hook and not against a joint; which is not the case in any similar invention. Its construction is such that it can be cast, instead of being made of wrought iron, which is not the case with any other, with which I am acquainted; consequently there is a great reduction in cost.

In all similar inventions, especially the hinged couplings, the hinge portion which is the principal, or expensive, part of the coupling, is attached to the thills and pole, so that a carriage, which has thills and pole both, requires a set of hinges for each, while in this coupling, the hook, which is the principal part, is attached to the carriage, so that only one set is required for thills and pole both; which of course, reduces the number required, in many cases, one half; consequently another great reduction in cost. This coupling is more convenient, than any other with which I am acquainted, because there is no bolt to be removed, when making the changes, and because, from its position, it is easy of access.

My invention consists in an improved method of attaching the thills and pole to carriages, or other vehicles, by which three important advantages are gained over all other couplings heretofore made.

First—seventy five per cent. of the expense is saved. Second—increased security against accidental disengagement. Third—great convenience in changing the thills for a pole, and vice versa. Besides these, it has other good qualities, such as great durability, total freedom from all noise, &c.

I do not claim the hook form of the block D, nor the mere use of a shoulder to sustain the pressure of the thills or pole, in backing, in any other connection; but

What I claim as my invention and desire to secure by Letters Patent is,

The construction and arrangement of the movable piece or block, E, having the notch G, and a screw-shank in half, and slightly wedge-shaped, in combination with the oblique shoulder H, on the notched screw-shank R, and with the hook J, of the block D, substantially in the manner and for the purposes herein set forth.

DOUGLAS BLY.

Witnesses:
J. FRANKLIN PECK,
SETH H. TERRY.